United States Patent [19]

Pearson

[11] 4,390,749

[45] Jun. 28, 1983

[54] NOISE CONTROL SYSTEM FOR FM RADIO

[75] Inventor: Erik W. Pearson, Canoga Park, Calif.

[73] Assignee: Superscope, Inc., Chatsworth, Calif.

[21] Appl. No.: 253,091

[22] Filed: Apr. 13, 1981

[51] Int. Cl.$^3$ .............................................. H04H 5/00
[52] U.S. Cl. .................................. 179/1 GJ; 455/297
[58] Field of Search ............ 179/1 GC, 1 GD, 1 GE, 179/1 GJ, 1 P; 455/212, 213, 218, 222, 223, 250, 296, 297, 312

[56] References Cited

U.S. PATENT DOCUMENTS

| | | | |
|---|---|---|---|
| 3,673,342 | 6/1972 | Muller | 179/1 GJ |
| 4,037,057 | 7/1977 | Ogita et al. | 179/1 GJ |
| 4,154,980 | 5/1979 | Schmidt et al. | 179/1 GD |
| 4,216,353 | 8/1980 | Fish | 179/1 GJ |
| 4,244,056 | 1/1981 | Hamada et al. | 455/312 X |
| 4,283,793 | 8/1981 | Numata | 455/213 |
| 4,293,736 | 10/1981 | Ogita | 179/1 GD |

OTHER PUBLICATIONS

Technical article entitled "Circuit for Reducing Multipath Distortion in Car FM Receivers" by Takenori Ugari and Yoichi Yano (pp. 57 and 60 of Sanyo Technical Review, vol. 13, Feb. 1, 1981).

Primary Examiner—A. D. Pellinen
Attorney, Agent, or Firm—Fulwider, Patton, Rieber, Lee & Utecht

[57] ABSTRACT

A noise control system for an FM stereo radio receiver is provided for controlling noise in the audio output, particularly in an area where the broadcast signal strength is relatively high. The system is designed for use with an FM stereo radio receiver having circuitry responsive to the strength of the broadcast radio signal for reducing stereo channel separation and/or high frequency response in low signal strength areas to prevent deterioration in the signal/noise ratio. The system includes a detection and control circuit for detecting the presence of relatively high noise levels substantially independent of the broadcast signal strength, such as multipath distortion encountered by a radio receiver in a vehicle moving through a high signal strength area. The detection and control circuit operates, in the presence of detected high noise levels, to control the adjustment circuitry to reduce channel separation and/or frequency response and thereby reduce the noise in the audio output.

11 Claims, 3 Drawing Figures

NOISE CONTROL SYSTEM FOR FM RADIO

BACKGROUND OF THE INVENTION

This invention relates to a noise control system for suppressing or eliminating noise in the audio output of radio receivers. More specifically, this invention relates to an improved noise detection and control system for use in FM stereo radio receivers installed in vehicles, and particularly for use in suppressing or eliminating noise such as multipath distortion occurring in areas where the broadcast signal strength is relatively high.

In radio reception, the signal to noise ratio of the audio output comprises an extremely important parameter defining the quality of that output. While the specific quality of the audio output is highly subjective according to the taste of each individual listener and is subject to other parameters such as frequency response, stereo channel separation, and the like, it is fundamental that the signal/noise ratio must be greater than some arbitrary threshold to provide an audio output for satisfactory listening. For most applications and for most listeners, it is highly desirable to provide an audio output having a signal/noise ratio which is sufficiently high such that background noise or interference in the audio output is no more than barely discernible to the average listener.

As a general rule, the signal/noise ratio of the audio output varies inversely as a function of the strength of the broadcast radio signal. Thus, when the broadcast signal strength is relatively strong, typically when the radio receiver is positioned physically near the transmission tower such as in a metropolitan area, the signal/noise ratio tends to be relatively high resulting in a satisfactory audio output. However, as the physical location of the radio receiver is moved away from the transmission tower, such as when the receiver is positioned in a remote or outlying area, noise level increases to result in a decreasing signal/noise ratio and a deteriorating audio output.

In FM stereo radio reception, a broadcast FM stereo signal is decoded or demodulated to produce right and left channel audio outputs. In the United States, decoding of the broadcast stereo signal is normally achieved by a so-called multiplexing circuit, typically in the form of a solid state chip. However, multiplexing of the broadcast signal substantially reduces the signal/noise ratio in the audio output. While this decrease in signal/noise ratio may not be normally discernible or critical in a high signal strength area, it is readily discernible in the audio output in a low signal strength area.

In the prior art, noise suppression systems have been proposed for controlling noise in an FM stereo radio receiver by switching operation of the receiver from stereo to monaural operation in response to the strength of the broadcast signal. More specifically, when the stereo receiver is switched to a monaural state, the signal/noise ratio loss incurred by multiplexing is eliminated to increase significantly the signal/noise ratio by as much as about 16 dB or more, and thereby suppress system noise. In some radios, this switching is achieved by a manual stereo/monaural selector button to enable the operator to change the mode of radio receiver operation according to his individual desires for stereo operation and his tolerance for noise. Other prior art systems have been proposed which automatically adjust or modulate the degree of stereo channel separation as an arbitrary function of broadcast radio signal strength without requiring manual operator intervention. In addition, some of these automatic systems have been combined with frequency response adjustment circuitry for reducing high frequency response of the radio receiver upon decreases in signal strength to filter at least some of the noise from the audio output, since a substantial portion of the noise tends to occur at the higher frequency levels. Thus, when the receiver is installed in a vehicle moving away from the transmission tower, the noise suppression system reduces the stereo channel separation and/or the high frequency response of the audio output as broadcast signal strength decreases to maintain a satisfactorily high signal/noise ratio of the audio output.

A major problem remains, however, in FM stereo radio receivers operated in high strength signal areas, and particularly when the receiver is installed in a vehicle moving rapidly through a high strength signal area. More specifically, a phenomena referred to as "multipath distortion" tends to occur in high strength signal areas wherein a variety of radio signals having substantially the same frequency arrive at the radio receiver at the same time, but with differing magnitudes and/or phase relationships when compared with the primary radio signal. These various signals can be created, for example, by means of the primary signal bouncing off or being reflected by buildings or other interferring structures in the radio field area. Alternately, these signals can arise by independent generation of unrelated signals as a result of a virtually infinite variety of electronic signals present in a metropolitan area. In any event, the effect of these signals is to superimpose a high level of noise upon the audio output even in a high strength signal area, and this undersirable effect is significantly enhanced when the receiver is installed in a vehicle and moved rapidly through the radio transmission field. Prior art noise suppression systems, however, have not provided any means for controlling or suppressing this noise in a high signal strength area.

The present invention comprises an improvement over prior noise suppression systems in FM stereo radio receivers by providing means for controlling the signal/noise ratio of the audio output in response to the presence of relatively high noise levels and substantially independent of the broadcast signal strength.

SUMMARY OF THE INVENTION

In accordance with the invention, a noise control system is provided for controlling the signal/noise ratio in an FM stereo radio receiver, and more particularly, for controlling the signal/noise ratio in response to the presence of relatively high noise levels such as multipath distortion occurring in a relatively high signal strength area. The invention comprises a detection and control circuit for sensing the presence of relatively high levels of noise received by the receiver antenna, and for responding to that level of noise when it exceeds a predetermined magnitude to effect a reduction in stereo channel separation and/or high frequency response. In this manner, system noise is substantially suppressed or eliminated to maintain signal/noise ratio at a satisfactory level, even in a high strength signal area.

In a preferred embodiment, the detection and control circuit is provided for use in conjunction with stereo channel separation and/or high frequency response adjustment circuitry for suppression of noise in an FM stereo radio receiver in response to the strength of the broadcast radio signal. More specifically, the radio receiver includes an antenna for receiving a broadcast radio signal which is amplified and supplied to an FM detector circuit, which is conventionally provided in the form of a solid state chip. The FM detector circuit responds to the input signal to provide a composite stereo signal to a multiplexing circuit for demodulation and reproduction as right and left channel audio outputs. The FM detector also supplies a dc control voltage proportional to the strength of the broadcast radio signal to the channel separation and/or frequency response adjustment circuitry to control or reduce separation and/or high frequency response of the audio output when signal strength is low, and maintain signal/noise ratio at an acceptable level.

The detection and control circuit of this invention adjusts the magnitude of the dc control voltage in response to the level of noise received by the antenna, substantially independent of the strength of the transmitted radio signal, whereby the channel separation and/or frequency response adjustment circuitry is made responsive to both signal strength and noise level. The detection and control circuit comprises a noise sensing circuit for sensing the presence of ac components superimposed upon the dc control voltage wherein the magnitude of such ac components are representative of noise, typically in the form of multipath distortion in a high strength signal area. The sensing circuit responds, when the instantaneous magnitude of such ac components exceed a predetermined threshold, to couple the dc control voltage to a voltage divider circuit. This voltage divider circuit substantially reduces the magnitude of the dc control voltage supplied to the channel separation and/or frequency response adjustment circuitry to a voltage level representative of a low strength broadcast radio signal. Thus, when instantaneous noise levels exceed the predetermined magnitude, the detection and control circuit operates the channel separation and/or frequency response adjustment circuitry to maintain the signal/noise ratio of the audio output, and thereby eliminate or suppress the noise.

Other features and advantages of the present invention will become apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
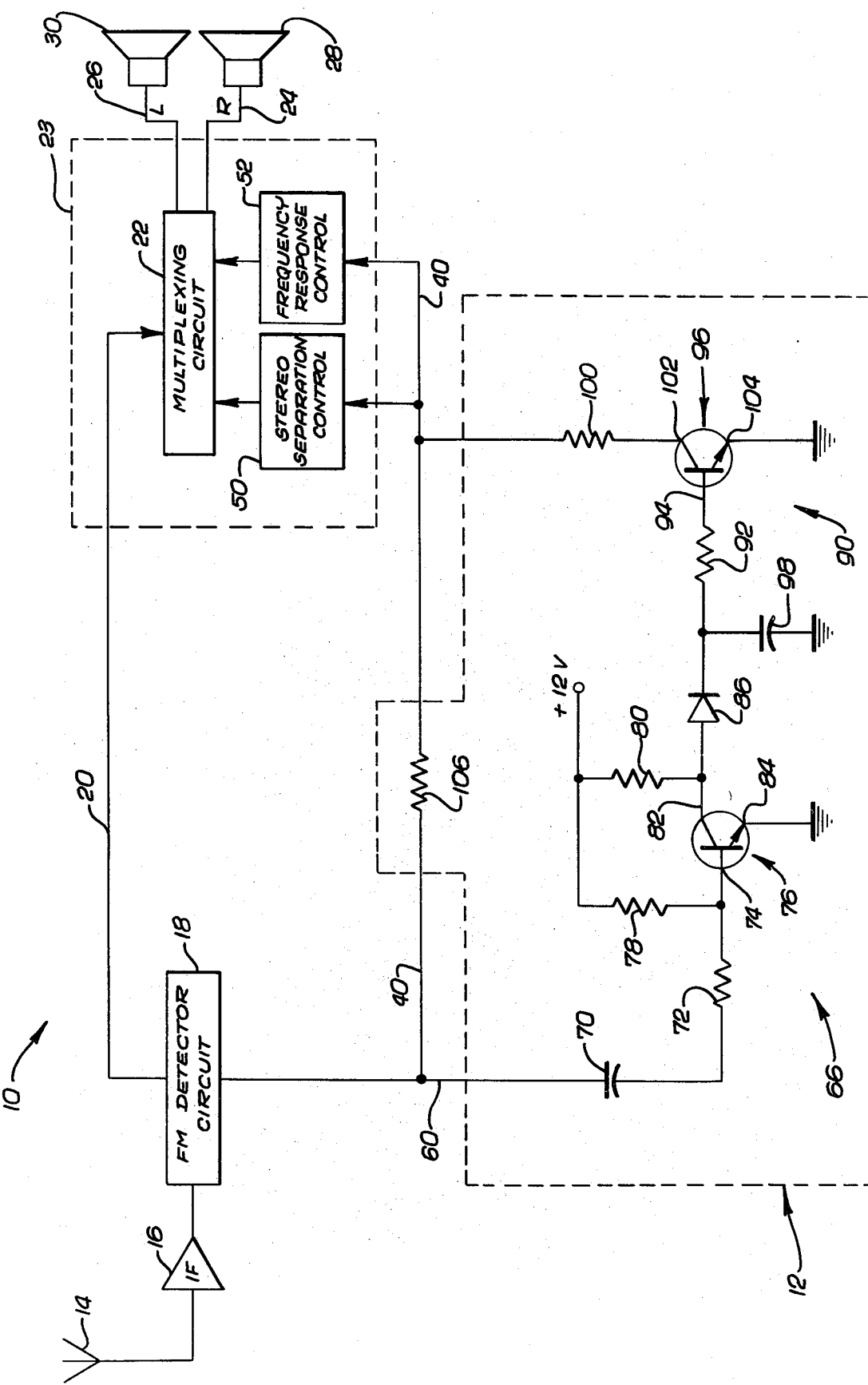
FIG. 1 is a schematic circuit diagram illustrating in simplified form an FM stereo radio receiver including a noise control system embodying the novel features of this invention.

An FM stereo radio receiver 10 is illustrated in simplified form in FIG. 1 to include a noise control system 12 embodying the novel features of this invention. The noise control system 12 is responsive to the level of noise received by the receiver 10 to eliminate or suppress a substantial portion of that noise when it exceeds a predetermined magnitude to to provide an audio output having a satisfactory signal/noise ratio.

The noise control system 12 of this invention is readily adapted for use with FM stereo radio receivers including means responsive to the strength of the broadcast radio signal to eliminate or suppress noise when the radio signal is relatively weak. The present noise control system 12, however, cooperates with such signal strength responsive means to render that means additionally responsive to the level of noise received by the receiver 10 regardless of the strength of the radio signal. This enables the suppression and/or elimination of noise, and a corresponding maintaining of the signal/noise ratio of the audio output at a satisfactory level, even in a high signal strength area when the noise level is objectionably high.

As illustrated in FIG. 1, the FM stereo radio receiver 10 conventionally includes an antenna 14 for reception of a broadcast FM stereo radio signal from an appropriate transmission tower (not shown). The received radio signal is supplied to a radio frequency amplifier such as a conventional intermediate frequency (IF) amplifier 16 appropriately tuned to the desired frequency range for reception of a selected radio broadcast channel. The IF amplifier 16 amplifies the radio signal and supplies it to an FM detector circuit 18 which conditions and tailors the signal to provide a composite stereo signal for supply via a conductor 20 to a multiplexing circuit 22. While the FM detector circuit 18 is not disclosed in detail herein, such circuits are conventionally provided in the form of a solid state chip such as FM detector chip model LA-1231 manufactured and sold by Sanyo Electric Co., Ltd.

The multiplexing circuit 22 demodulates and decodes the composite audio signal to provide separate right and left channel audio outputs. These outputs are supplied through conductors 24 and 26, respectively, to a pair of speakers 28 and 30 to provide the stereo audio output for the receiver. Of course, when the radio signal received at the antenna is a monaural signal instead of a stereo signal, the right and left channel outputs are identical. Conveniently, in most modern FM stereo radio receivers, the multiplexing circuit 22 is provided in the form of a solid state chip, such as FM stereo multiplex chip model LA-3370 manufactured and sold by Sanyo Electric Co., Ltd., whereby the details of the circuit are not shown or described herein. This particular chip advantageously includes additional circuitry for use in noise suppression, as will be described in more detail, and accordingly, the chip is illustrated by reference numeral 23 in FIG. 1.

In FM stereo radio receivers of the type illustrated, it is known that multiplexing of the composite audio signal results in a reduction in the signal/noise ratio of the stereo audio output at the speakers 28 and 30. That is, as compared with a monaural signal, demodulation and decoding of a stereo radio signal inherently requires certain system power losses which result in a signal/noise ratio reduction of 16 dB or more. When the broadcast radio signal is relatively strong, such as when the receiver 10 is physically located near the transmission tower (not shown), the signal/noise ratio is normally sufficiently high such that the reduction in signal/noise ratio from stereo operation does not result in an unsatisfactory deterioration in the audio output. However, as the radio signal becomes weaker, such as when the receiver 10 is physically located at a substantial distance from the transmission tower, the signal/noise ratio drops to an extent such that the additional signal/noise ratio reduction from stereo operation results in an audio output having high noise levels.

Figure 3:
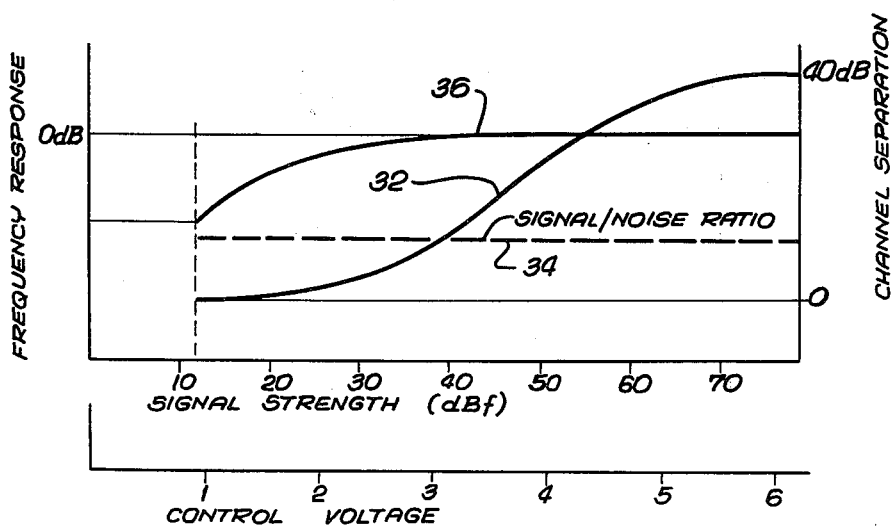
FIG. 3 is a graphic representation illustrating operation of the noise control system to reduce stereo channel separation and/or high frequency response.

To prevent this drop-off in the signal/noise ratio when the broadcast radio signal becomes weak, the radio receiver 10 is provided with circuit means responsive to the signal strength for maintaining the signal/noise ratio at a substantially constant level for satisfactory listening. More specifically, this circuit means conventionally comprises a circuit 50 (FIG. 1) for reducing the stereo separation of the right and left channels to prevent at least a portion of the multiplexing power losses. By gradually reducing the stereo channel separation concurrently with a reduction in signal strength, as illustrated by the plot 32 in FIG. 3, the signal/noise ratio of the audio output can be maintained substantially constant as illustrated by the plot 34 in FIG. 3, or at least above some arbitrary minimum signal/noise threshold.

Alternately, or in addition to the channel separation control circuit, a frequency response control circuit 52 (FIG. 1) can be provided for reducing the high frequency response of the receiver 10 as a function of a decreasing signal strength. For example, as illustrated by the plot 36 in FIG. 3, the high frequency response can be maintained substantially constant over a substantial range of signal strengths and to drop off at a selected rate at relatively low signal strengths. Since at least a major portion of noise in the audio output occurs at a relatively high frequency, whereby the drop-off in high frequency response tends to filter out a substantial portion of this noise to result in an increasing signal/noise ratio concurrently with decreases in signal/noise ratio arising by virtue of the decreased signal strength. Appropriate matching between the high frequency response curve and the signal strength yields an audio output signal/noise ratio which is substantially constant throughout a range of signal strengths, as illustrated by the plot 34 in FIG. 3, or at least above a prescribed minimum threshold.

The stereo channel separation control circuit 50 and/or the high frequency response control circuit 52 normally comprises a portion of the multiplex chip 23 illustrated in block form in FIG. 1, whereby these circuits are not shown or described herein in terms of discrete electronic components. Specifically, the above-reference FM stereo multiplex chip model LA-3370 manufactured and sold by Sanyo Electric Co., Ltd., includes both the channel separation and frequency response control circuits 50 and 52 for simultaneous control of channel separation and frequency response as a function of signal strength to maintain the signal/noise ratio of the audio output at an acceptable level by virtue of a compromise between channel separation and frequency response reductions.

Figure 2:
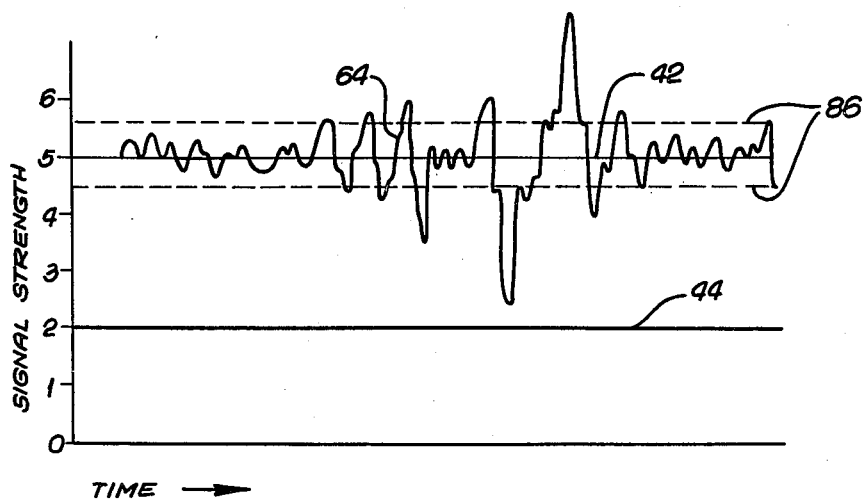
FIG. 2 is a graphic representation illustrating the presence of noise superimposed upon a transmitted radio signal.

To control operation of the channel separation and/or frequency control circuits 50 and 52, a control voltage is provided at an output port 38 of the FM detector circuit 18 and is supplied via a conductor 40 to the circuits 50 and 52. This control voltage conventionally comprises a dc control voltage having a magnitude proportional to the strength of the radio signal received at the antenna 12. For example, when the FM detector circuit 18 comprises the above-referenced Sanyo model LA-1231 solid state chip, the control voltage typically is on the order of about five volts in a high strength signal area and about two volts or less in a relatively low strength signal area. These exemplary voltages in relation to signal strength are illustrated in FIG. 2 by the dc voltage plots 42 and 44, respectively. If desired, this dc control voltage can be supplied through a voltage division circuit (not shown) to the circuits 50 and 52, with the relative voltages supplied to the circuits dictating the functional relationship of broadcast signal strength with channel separation and frequency response.

The noise control system 12 of this invention is provided for suppressing and/or eliminating noise in the audio output in response to an additional parameter, namely, the magnitude of noise received at the antenna independent of the strength of the broadcast radio signal. More specifically, the instantaneous magnitude of noise received at the antenna can be sufficiently high to be discernible in the audio output even in a high strength signal area. For example, in a metropolitan area, so-called multipath distortion can occur by virtue of the broadcast radio signal being reflected by obstacles such as buildings to create a variety of substantially common frequency signals arriving at the antenna with different magnitudes and phases. These various signals are detected by the receiver 10 as noise, resulting in a swishing sound or in bursts of static in the audio output. This problem of multipath distortion is compounded when the receiver is mounted in a vehicle and the vehicle is moved rapidly through the field of radio reception.

According to the invention, the noise control system 12 functions to suppress or eliminate instantaneous occurrences of high level noise such as that related to multipath distortion is a high strength signal area. The system 12 achieves this control by sensing the presence of noise above a predetermined and arbitrary set threshold, and by responding to this sensed noise to reduce the magnitude of that DC control voltage supplied to the stereo separation and/or high frequency response control circuits 50 and 52. In this manner, when the noise level is high, the reduced dc control voltage operates the channel separation circuit 50 and/or the frequency response circuit 52 to reduce separation and/or frequency response as if the signal strength at the antenna 14 were low.

The presence of noise received by the antenna 12, particularly multipath distortion in a high signal strength area, comprises amplitude modulated signals which appear as ac signal components superimposed upon the dc control voltage applied to the conductor 40. More specifically, with reference to FIG. 2, the dc control voltage in a high strength signal area is illustrated by the constant dc voltage line 42 having a relatively high magnitude of about five volts for a relatively high signal strength area. Noise or interference, if present, is embodied in an extremely complex or irregular ac-type signal illustrated by the line 64 superimposed over the dc voltage 42. Whenever this ac signal exceeds a certain peak-to-peak magnitude irrespective of the magnitude of the dc voltage 42, the signal/noise ratio is of the audio output is instantaneously reduced to an extent such that audible noise is discernible in the output.

The noise control system 12 of this invention comprises a noise sensing circuit 66 coupled to the dc control voltage conductor 40 for sensing instantaneous noise levels exceeding a predetermined and arbitrarily selected magnitude. In particular, the sensing circuit 66 includes an input conductor 60 connected to the control voltage 40, and this input conductor 60 includes a capacitor 70 for allowing passage of ac signal components to the exclusion of the dc control voltage. These ac signal components are coupled through a sensitivity resistor 72 to the base 74 of an npn switching transistor 76. A biasing voltage, such as a 12 volt dc supply from the storage battery of a vehicle, is also coupled to the base 74 of the switching transistor through a bias setting resistor 78. This 12 volt dc supply is also coupled through a load resistor 80 to the collector 82 of the switching transistor 76, and the emitter 84 of the transistor is coupled to ground.

The relative resistance value of the sensitivity and the bias setting resistors 72 and 78 are chosen so that the transistor 76 is biased to an "on" condition whenever the negative peak magnitude of the ac signal components are less than the predetermined and arbitrarily set magnitude, such as one-half volt as illustrated by the dashed lines 86 in FIG. 2. In the "on" state, the transistor provides a closed circuit communicating the load resistor 80 to ground, whereby the voltage level at the collector 82 of the switching transistor 76 is very small.

Whenever the negative peak of the ac signal components exceeds the predetermined threshold, the switching transistor 76 instantaneously switches to an "off" state. When this occurs, the load resistor 80 is disconnected from the emitter 84 of the transistor and thereby also disconnected from ground. This results in a substantial increase in the voltage level at the collector 82 of the transistor 76 which is coupled through a forward biased diode 88 to a voltage divider circuit 90. This supply of voltage from the sensing circuit 66 to the voltage divider circuit 90 is generally in the nature of a pulse-type supply, since the negative peak of the ac signal components normally do not exceed the threshold level except for very brief periods of time.

The voltage divider circuit 90 includes a resistor 92 through which the voltage from the sensing circuit 66 is supplied to the base 94 of an npn control transistor 96, and an integrating capacitor 98 coupled to ground. In operation, the capacitor 98 and the resistor 92 are chosen to allow the voltage pulses supplied to the voltage divider circuit 90 to cause a relatively rapid switching of the control transistor 96 from an "off" state to and "on" state, say on the order of about two milliseconds. Once the transistor 96 is "on", the capacitor 96 is chosen to dissipate the accumulated charge at the base 94 at a slower rate, say about 700 milliseconds, to maintain the transistor 96 in the "on" state for at least a brief period of time.

When the control transistor 96 is switched "on" by the presence of relatively high level noise, the control transistor 96 closes a circuit path path connecting a dividing resistor 100 between the control voltage conductor 40 to the collector 102 of the transistor 96, and further via the emitter 104 to ground. This dividing resistor 100 operates, in conjunction with a second dividing resistor 106 along the conductor 40, to substantially reduce the magnitude of the control voltage supplied to the channel separation and/or frequency response circuits 50 and 52 throughout the duration of the high level noise. This reduction in the control voltage magnitude is sufficient to control the channel separation and/or frequency response circuits to reduce channel separation and/or frequency response and thereby maintain signal/noise ratio at an acceptable level.

The noise control system of this invention thus renders the receiver 10 responsive to instantaneous bursts of noise arising primarily from multipath distortion as well as noise arising from a decreased broadcast signal strength. The channel separation and/or frequency response control circuits are operated in the same manner to maintain signal/noise ratio in response to both controlling parameters, namely, noise level and signal strength. Thus, a wide range of noise suppression and control is obtained by use of relatively simple and inexpensive electronic components.

A variety of modifications and improvements to the invention described herein are believed to be apparent to one skilled in the art. Accordingly, no limitation upon the invention is intended, except by way of the appended claims.

What is claimed is:

1. In a radio receiver including means for receiving a broadcast FM stereo radio signal and for converting the signal to a stereo radio audio output, a noise control system, comprising:
   noise reduction means responsive to the strength of the broadcast radio signal for reducing noise in the audio output when the signal strength is relatively low, said noise reduction means including means for generating a substantially dc voltage having a magnitude proportional to the strength of the broadcast radio signal and means responsive to said dc voltage for reducing noise in the audio output when the broadcast signal strength is relatively low;
   detection means for detecting the presence of relatively high levels of noise substantially independent of signal strength, said detection means including a sensing circuit for sensing the presence of ac signal components indicative of noise superimposed upon said dc voltage and for generating an electrical signal when said sensed ac signal components exceed a predetermined threshold magnitude; and
   control means responsive to detection of relatively high levels of noise by said detection means for controlling the operation of said noise reduction means to reduce noise in the audio output, said control means including means responsive to said electrical signal generated by said sensing circuit for coupling said dc voltage to a voltage divider circuit and for supplying a divided voltage of reduced magnitude to said means responsive to said dc voltage for reducing noise in the audio output.

2. The noise control system of claim 1 wherein said noise reduction means comprises means for adjusting stereo separation of the audio output in response to the strength of the broadcast radio signal.

3. The noise control system of claim 2 wherein said stereo separation adjusting means comprises means for generating an electrical signal representative of the strength of the broadcast radio signal, and means responsive to said electrical signal for reducing stereo separation of the audio output when the strength of the broadcast radio signal is relatively low.

4. The noise control system of claim 1 wherein said means for generating said noise-indicative electrical signal is responsive to substantially instantaneous noise levels above a predetermined threshold.

5. The noise control system of claim 1 wherein said noise reduction means comprises means for reducing high frequency response upon decreases in the strength of the broadcast radio signal.

6. The noise control system of claim 1 wherein said means responsive to said dc voltage for reducing noise in the audio output comprises means for reducing stereo separation and high frequency response of the audio output.

7. In a radio receiver including means for receiving a broadcast FM stereo radio signal and for converting the signal to a stereo radio audio output, and noise reduction means responsive to the strength of the broadcast radio signal for reducing noise in the audio output when the signal strength is relatively low, a noise control system, said noise reduction means including means for generating a substantially dc voltage having a magnitude proportional to the strength of the broadcast radio signal and means responsive to said dc voltage for reducing noise in the audio output when the broadcast signal strength is relatively low, comprising:

detection means for detecting the presence of relatively high levels of noise substantially independent of the strength of the broadcast radio signal, said detection means including a sensing circuit for sensing the presence of ac signal components indicative of noise superimposed upon said dc voltage and for generating an electrical signal when said sensed ac signal components exceed a predetermined threshold magnitude; and control means responsive to the detection of relatively high levels of noise by said detection means for rendering said noise reduction means additionally responsive to said relatively high levels of noise to reduce noise in the audio output, said control means including means responsive to said electrical signal generated by said sensing circuit for coupling said dc voltage to a voltage divider circuit and for supplying a divided voltage of reduced magnitude to said means responsive to said dc voltage for reducing noise in the audio output.

8. In a radio receiver including means for receiving a broadcast FM stereo radio signal and for converting the stereo signal to a stereo audio output, a noise control system, comprising:

means for generating a substantially dc voltage proportional to the strength of the broadcast radio signal;

noise reduction means responsive to the magnitude of said dc voltage for reducing noise in the audio output, said noise reduction means including at least one of stereo separation means for reducing stereo separation and high frequency response means for reducing high frequency response of the audio output when the broadcast signal strength is relatively low;

a conductor for coupling said dc voltage from said signal generating means to said noise reduction means;

detection means for sensing the presence of ac signal components indicative of noise superimposed upon said dc voltage and for generating an electrical signal when said sensed ac signal components exceed a predetermined threshold of magnitude; and control means including a voltage divider circuit and switch means responsive to said electrical signal generated by said detection means for coupling said voltage divider circuit to said conductor for reducing the magnitude of said dc voltage supplied to said noise reduction means to a level sufficient to operate said noise reduction means to reduce noise in the audio output.

9. In a radio receiver for receiving a broadcast FM stereo radio signal and for converting the signal to a stereo radio audio output, a method of controlling noise in the audio output, comprising the steps of:

providing noise reduction means operable to reduce noise in the audio output;

detecting the strength of the broadcast radio signal by generating a substantially dc voltage having a magnitude proportional to the broadcast signal strength and supplying the dc voltage to the noise reduction means in response to the signal strength to reduce noise in the audio output when signal strength is relatively low; and detecting the presence of relatively high levels of noise substantially independent of signal strength by sensing the presence of ac signal components indicative of noise superimposed upon the dc voltage and having a magnitude greater than a predetermined threshold and coupling a voltage divider circuit to the dc voltage when the ac signal components exceed the predetermined threshold to reduce the magnitude of the dc voltage supplied to the noise reduction means to reduce noise in the audio output substantially independent of broadcast signal strength.

10. The method of claim 9 wherein said step of providing noise reduction means comprises providing at least one of stereo separation means for reducing stereo separation and high frequency response means for reducing high frequency response of the audio output in response to the magnitude of the dc voltage supplied thereto.

11. In a radio receiver for receiving a broadcast FM stereo radio signal and for converting the stereo signal to a stereo audio output, a method of controlling noise in the audio output, comprising the steps of:

generating a substantially dc voltage proportional to the strength of the broadcast radio signal;

providing noise reduction means in the form of at least one of stereo separation means for reducing stereo separation and high frequency response means for reducing high frequency response of the audio output in response to the dc voltage when the voltage has a magnitude representative of a relatively low broadcast signal strength;

detecting the presence of ac signal components indicative of noise superimposed upon the dc voltage;

generating an electrical signal responsive to the presence of the ac signal components at a magnitude greater than a predetermined threshold; and coupling a voltage divider circuit to the dc voltage in response to the noise indicative electrical signal to reduce the magnitude of the dc voltage supplied to the noise reduction means substantially independent of broadcast signal strength.

* * * * *